US007853566B2

(12) United States Patent
Cisler et al.

(10) Patent No.: US 7,853,566 B2
(45) Date of Patent: *Dec. 14, 2010

(54) NAVIGATION OF ELECTRONIC BACKUPS

(75) Inventors: Pavel Cisler, Los Gatos, CA (US); Gene Zyrl Ragan, Santa Clara, CA (US); Mike Matas, Palo Alto, CA (US); Gregory N. Christie, San Jose, CA (US); Kevin Tiene, Cupertino, CA (US); David Hart, San Francisco, CA (US); Loic Vandereyken, Palo Alto, CA (US); Robert M Chinn, Redwood City, CA (US); Marcel M W A van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 11/499,879

(22) Filed: Aug. 4, 2006

(65) Prior Publication Data

US 2008/0034327 A1 Feb. 7, 2008

(51) Int. Cl.
*G06F 17/30* (2006.01)
(52) U.S. Cl. ..................... 707/654; 715/229
(58) Field of Classification Search ............... 707/100, 707/654; 715/229
See application file for complete search history.

(56) References Cited

U.S. PATENT DOCUMENTS 5,150,473 A 9/1992 Zulch
5,163,148 A 11/1992 Walls
5,276,867 A 1/1994 Kenley et al.
5,680,562 A 10/1997 Conrad et al.
5,745,669 A 4/1998 Hugard et al.

(Continued)

FOREIGN PATENT DOCUMENTS

EP 0629950 12/1994

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner*—James Trujillo
*Assistant Examiner*—Amresh Singh
(74) *Attorney, Agent, or Firm*—Fish & Richardson P.C.

(57) ABSTRACT

Systems and methods for navigating within snapshots are provided. In one implementation a method is provided. The method includes receiving, while a current view is displayed in a user interface, a first user input requesting that a history view associated with the current view be displayed. The history view is displayed in response to the first user input, the history view including at least a first visual representation of an earlier version of the current view, the earlier version including a hierarchical structure wherein a first element of the earlier version includes a second element. There is received, while the history view is displayed, a second user input requesting that the current view be modified according to the second element. The method includes modifying, in response to the second user input, the current view according to the second element.

30 Claims, 10 Drawing Sheets

U.S. PATENT DOCUMENTS

| | | |
|---|---|---|
| 5,758,359 A | 5/1998 | Saxon |
| 5,790,120 A | 8/1998 | Lozares et al. |
| 5,818,936 A | 10/1998 | Mashayekhi |
| 5,819,292 A | 10/1998 | Hitz et al. |
| 5,831,617 A | 11/1998 | Bhukhanwala |
| 5,832,526 A * | 11/1998 | Schuyler .................... 1/1 |
| 5,961,605 A | 10/1999 | Deng et al. |
| 5,987,566 A | 11/1999 | Vishlitzky et al. |
| 6,023,506 A | 2/2000 | Ote et al. |
| 6,097,313 A | 8/2000 | Takahashi et al. |
| 6,112,318 A | 8/2000 | Jouppi et al. |
| 6,167,532 A | 12/2000 | Wisecup |
| 6,188,405 B1 | 2/2001 | Czerwinski et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,625,704 B2 | 9/2003 | Winokur |
| 6,711,572 B2 | 3/2004 | Zakharov et al. |
| 6,714,201 B1 | 3/2004 | Grinstein et al. |
| 6,785,751 B1 | 8/2004 | Connor |
| 6,785,786 B1 | 8/2004 | Gold et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,948,039 B2 | 9/2005 | Biessener et al. |
| 6,959,368 B1 | 10/2005 | St. Pierre et al. |
| 7,072,916 B1 | 7/2006 | Lewis et al. |
| 7,103,740 B1 | 9/2006 | Colgrove et al. |
| 7,111,136 B2 | 9/2006 | Yamagami |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,318,134 B1 | 1/2008 | Oliveira et al. |
| 7,418,619 B1 | 8/2008 | Uhlmann et al. |
| 7,440,125 B2 | 10/2008 | Maekawa et al. |
| 7,518,611 B2 | 4/2009 | Boyd et al. |
| 7,630,021 B2 | 12/2009 | Matsuzaka et al. |
| 7,669,141 B1 | 2/2010 | Pegg |
| 7,676,689 B1 | 3/2010 | Shioyama et al. |
| 2001/0047368 A1 | 11/2001 | Oshinsky et al. |
| 2002/0023198 A1 | 2/2002 | Kokubun et al. |
| 2002/0054158 A1 | 5/2002 | Asami |
| 2002/0063737 A1 | 5/2002 | Feig et al. |
| 2002/0160760 A1 | 10/2002 | Aoyama |
| 2002/0174283 A1 | 11/2002 | Lin |
| 2003/0063128 A1 | 4/2003 | Salmimaa et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0172937 A1 | 9/2003 | Faries et al. |
| 2003/0220949 A1 | 11/2003 | Witt et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0133575 A1 | 7/2004 | Farmer et al. |
| 2004/0139396 A1 | 7/2004 | Gelernter et al. |
| 2004/0167942 A1 | 8/2004 | Oshinsky et al. |
| 2004/0193953 A1 | 9/2004 | Callahan et al. |
| 2004/0210608 A1 | 10/2004 | Lee et al. |
| 2004/0220980 A1 | 11/2004 | Forster |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0053332 A1 | 3/2006 | Uhlmann |
| 2006/0064444 A1 | 3/2006 | Van Ingen et al. |
| 2006/0085792 A1 | 4/2006 | Traut |
| 2006/0085817 A1 | 4/2006 | Kim et al. |
| 2006/0101384 A1 * | 5/2006 | Sim-Tang et al. ........... 717/104 |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0161861 A1 | 7/2006 | Holecek et al. |
| 2006/0218363 A1 | 9/2006 | Palapudi |
| 2006/0248294 A1 | 11/2006 | Nedved et al. |
| 2007/0027935 A1 | 2/2007 | Haselton et al. |
| 2007/0030528 A1 | 2/2007 | Quaeler et al. |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0185922 A1 | 8/2007 | Kapoor et al. |
| 2007/0192386 A1 | 8/2007 | Fries et al. |
| 2007/0266007 A1 | 11/2007 | Arrouye et al. |
| 2007/0271303 A1 | 11/2007 | Menendez et al. |
| 2007/0288536 A1 | 12/2007 | Sen et al. |
| 2008/0016576 A1 | 1/2008 | Ueda et al. |
| 2008/0028007 A1 | 1/2008 | Ishii et al. |
| 2008/0033922 A1 | 2/2008 | Cisler et al. |
| 2008/0034004 A1 | 2/2008 | Cisler et al. |
| 2008/0034011 A1 | 2/2008 | Cisler et al. |
| 2008/0034013 A1 | 2/2008 | Cisler et al. |
| 2008/0034017 A1 | 2/2008 | Giampaolo et al. |
| 2008/0034018 A1 | 2/2008 | Cisler et al. |
| 2008/0034019 A1 | 2/2008 | Cisler et al. |
| 2008/0034039 A1 | 2/2008 | Cisler et al. |
| 2008/0059894 A1 | 3/2008 | Cisler et al. |
| 2008/0077808 A1 | 3/2008 | Teicher et al. |
| 2008/0091655 A1 | 4/2008 | Gokhale et al. |
| 2008/0126441 A1 | 5/2008 | Cisler et al. |
| 2008/0126442 A1 | 5/2008 | Cisler et al. |
| 2008/0141029 A1 | 6/2008 | Culver |
| 2008/0177961 A1 | 7/2008 | McSharry et al. |
| 2008/0229037 A1 | 9/2008 | Bunte et al. |
| 2008/0285754 A1 | 11/2008 | Kezmann |
| 2010/0017855 A1 | 1/2010 | Johnson et al. |

FOREIGN PATENT DOCUMENTS

| | | |
|---|---|---|
| EP | 1152352 | 11/2001 |
| EP | 1582982 | 10/2005 |
| WO | 01/06356 | 1/2001 |
| WO | 02/101540 | 12/2002 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www,wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

"MSDN Academic Alliance Developer Center, Curriculum Repository Glossary," [online]. Retrieved from the Internet <URL: http://www.academicresourcecenter.net/curriculum/glossary.aspx>, retrieved on Apr. 22, 2009, 4 pages.

International Search Report and Written Opinion, PCT/US2008/066212, Mar. 9, 2009, 20 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"StorageSync: Backup, Restore, & Synchronization Software User's Guide", SimpleTech, 2003, 100 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

Communication pursuant to Article 94(3) EPC for Application No. EP 07 799 899.5, dated Oct. 7, 2009, 4 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html; 11 pages.

* cited by examiner

NAVIGATION OF ELECTRONIC BACKUPS

RELATED APPLICATIONS

This application is generally related to the following jointly owned and co-pending patent applications, each incorporated herein by reference in its entirety:

U.S. patent application Ser. No. 11/499,839, for "Managing Backup of Content," filed Aug. 4, 2006;

U.S. patent application Ser. No. 11/499,881, for "User Interface for Backup Management," filed Aug. 4, 2006;

U.S. patent application Ser. No. 11/499,250, for "Application-Based Backup-Restore of Electronic Information," filed Aug. 4, 2006;

U.S. patent application Ser. No. 11/499,880, for "Architecture for Back Up and/or Recovery of Electronic Data," filed Aug. 4, 2006;

U.S. patent application Ser. No. 11/499,385, for "Searching a Backup Archive," filed Aug. 4, 2006;

U.S. patent application Ser. No. 11/499,885, for "Conflict Resolution in Recovery of Electronic Data," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,256, for "Consistent Back Up of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user may have had second thoughts about the revisions, or may have come up with new ideas, and therefore open the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods for navigating within snapshots are provided. A user can manipulate a selected snapshot as a hierarchical file structure. For example, the user can navigate a file system to select and open folders in order to find a particular sub-folder or file within a folder. Additionally, navigating to a different level in the snapshot changes the view provided by the other snapshots to reflect views at the same level.

In general, in one aspect, a method relating to modifying a view in a user interface is provided. The method includes receiving, while a current view is displayed in a user interface, a first user input requesting that a history view associated with the current view be displayed. The history view is displayed in response to the first user input, the history view including at least a first visual representation of an earlier version of the current view, the earlier version including a hierarchical structure wherein a first element of the earlier version includes a second element. There is received, while the history view is displayed, a second user input requesting that the current view be modified according to the second element. The method includes modifying, in response to the second user input, the current view according to the second element.

Implementations can include one or more of the following features. The first element can be one selected from the group including a folder, a file, an item, an information portion, a playlist, a directory, an image, system parameters, and combinations thereof. The second user input can be received while the current view presents a level of the hierarchical structure associated with the first element. The first user input can be received while the current view presents a level of the hierarchical structure associated with the second element. The first visual representation of the earlier version of the current view can be included in a timeline presented in the history view, the timeline including several visual representations of earlier versions of the current view. The history view can further include an input control for modifying the timeline to include only at least one of the visual representations whose corresponding earlier version differs from the current view. After the user selects the second element, the method can further include displaying a revised timeline in response to the selection, the revised timeline includes a first visual representation of an earlier version of the second element. The first element can have a folder structure. The second element can be a file in the folder structure of the first element. Receiving the second user input can include receiving an input to traverse the hierarchical structure and display the second element.

In general, in one aspect, a computer program product is provided. The computer program product includes instructions to generate on a display device a graphical user interface. The graphical user interface includes a view display area for presenting a current view, a history view display area for presenting (i) a history view associated with the current view, the history view including at least a first visual representation of an earlier version of the current view, the earlier version including a hierarchical structure wherein a first element of the earlier version includes a second element and (ii) a revised version of the history view after a user selects the second element, the revised version including at least a first visual representation of an earlier version of the second element, and an input control for initiating a restoration of the current view according to the earlier version of the second element.

Implementations can include one or more of the following features. The graphical user interface can begin displaying the history view while the current view presents a level of the hierarchical structure associated with the first element. The graphical user interface can begin displaying the history view while the current view presents a level of the hierarchical structure associated with the second element. The first visual representation can be included in a timeline presented in the history view, the timeline including several visual representations of earlier versions of the current view. The history view can further include another input control for modifying the timeline to include only at least one of the visual representations whose corresponding earlier version differs from the current view. The revised history view can include a revised timeline that includes a first visual representation of an earlier version of the second element.

In general, in one aspect, a method includes defining a criterion for capturing a state of a structured element, the structured element including one or more second elements and being presented in a user interface. A state of the structured element is captured, including capturing an organization and content of the structured element. A prompt is received to suspend presentation of a current view and present a captured view, the captured view including organization and content of the structured element at a previous time. The method further includes reinstating the captured view into the current view of the user interface.

Implementations can include one or more of the following features. The method can further include while presenting the captured view, navigating the structured element to locate the one or more second elements. The method can further include while presenting the captured view, traversing the structured element to display one or more sub-structure elements.

In general, in one aspect, a method is provided. The method includes evaluating a current view of a user interface including evaluating a state of an organization and content of a structured element presented in the current view. A determination is made that an undesirable change to the current view of the user interface has occurred relative to a past view of the user interface, the undesirable change relative to the organization or content of the structured element. The current view of the user interface is suspended. There is presented one or more past views of the user interface each including an organization and content of the structured element at a respective time. The method further includes reinstating a past view of the user interface into the current view including reinstating an organization or content of the structured element.

Implementations of the method can include one or more of the following features. The method can further include navigating a presented past view to locate one or more structured elements. The method can further include traversing a structured element to display one or more sub-structure elements associated with the structured element.

The details of the various aspects of the subject matter described in this specification are set forth in the accompanying drawings and the description below. Other features, aspects, and advantages of the invention will become apparent from the description, the drawings, and the claims.

BRIEF DESCRIPTION FO THE DRAWINGS

DETAILED DESCRIPTION

Figure 1:
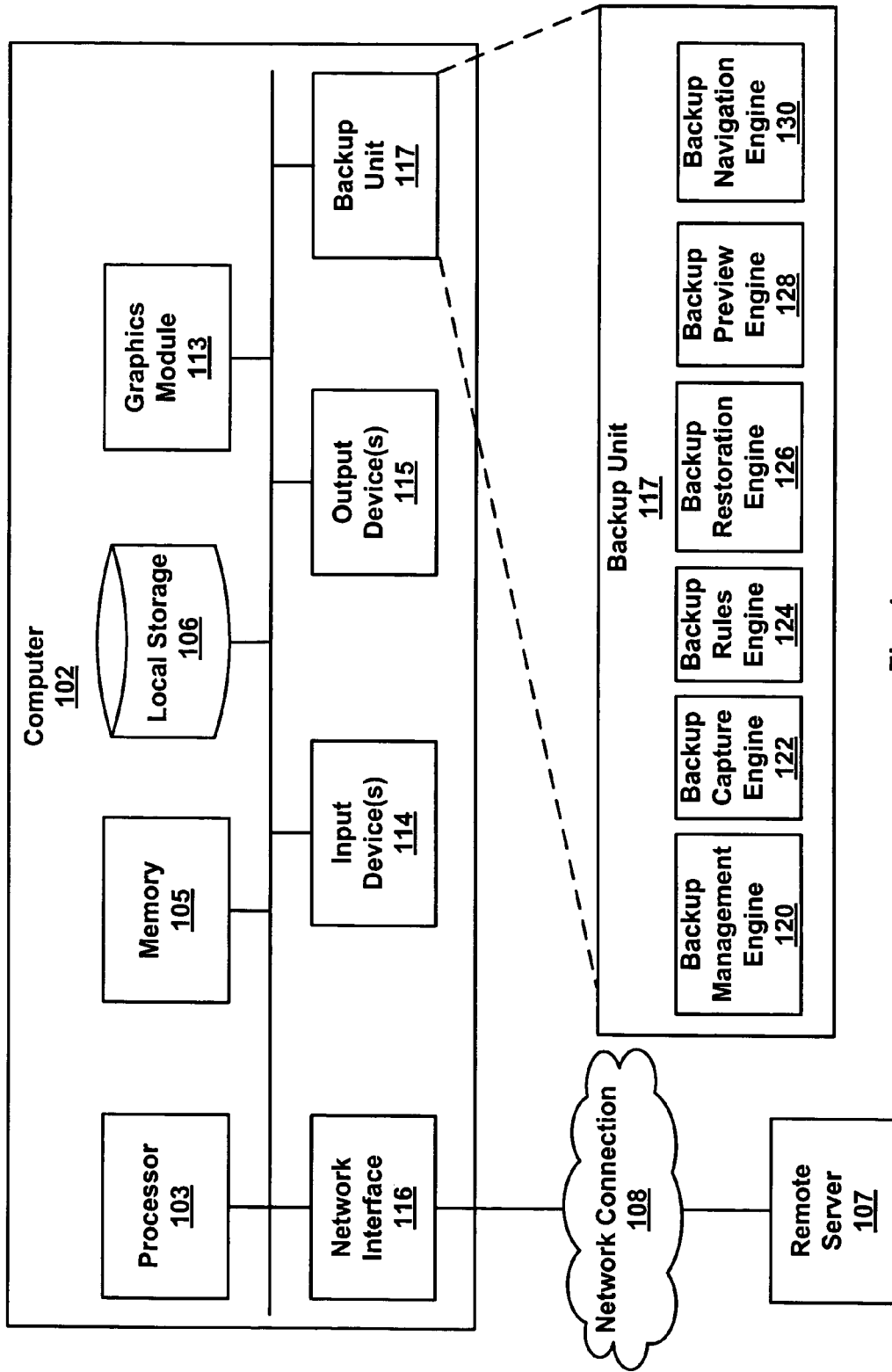
FIG. 1 is a block diagram of a hardware architecture for previewing, installing, managing and operating widgets in a display environment.

FIG. 1 is a block diagram of a hardware architecture 100 for modifying a user interface view. The architecture 100 includes a personal computer 102 coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a visual user interface, including without limitation, portable and desktop computers, servers, electronics, media players, game devices, mobile phones, email devices, personal digital assistants (PDAs), embedded devices, televisions, etc.

The computer 102 includes a backup unit 117 that allows for the storage of versions of the computer's files to be saved, either within the local storage 106 or in an external storage repository. A backup management engine 120 coordinates the collection, storage, and retrieval of file versions performed by the backup unit 117. A backup capture engine 122 locates changed files which are in need of backup. The backup capture engine 122 then stores copies of these files in a targeted storage repository. The backup capture engine 122 can track multiple version copies of each file included in the backup repository.

A backup rules engine 124 contains settings for the details of capturing and storing the earlier versions. For example, the backup rules engine 124 can determine the frequency of the backup capture, the storage location for the backup versions, the types of files that are eligible for backup capture, and the events which trigger a backup capture (periodic or event-driven, etc.). A user can invoke a backup restoration engine 126 to restore previous versions of files which were captured by the backup capture engine 122. A backup preview engine 128 is configured to provide a preview of at least one of the captured earlier versions. A backup navigation engine 130 is configured to manage the aspects of backup relating to structured elements. For example, when a backup version of a folder has been created, the backup navigation engine 130 can provide that a file within that folder can be selected for restoration.

A system and methods are provided for modifying a user interface view. The systems and methods can be stand-alone or otherwise integrated into a more comprehensive application. In the materials presented below, an integrated system and method for modifying a user interface view is disclosed. However, one of ordinary skill in the art will recognize that the engines, methods, processes and the like that are described can themselves be an individual process or application, part of an operating system, a plug-in or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.)

Figure 2:
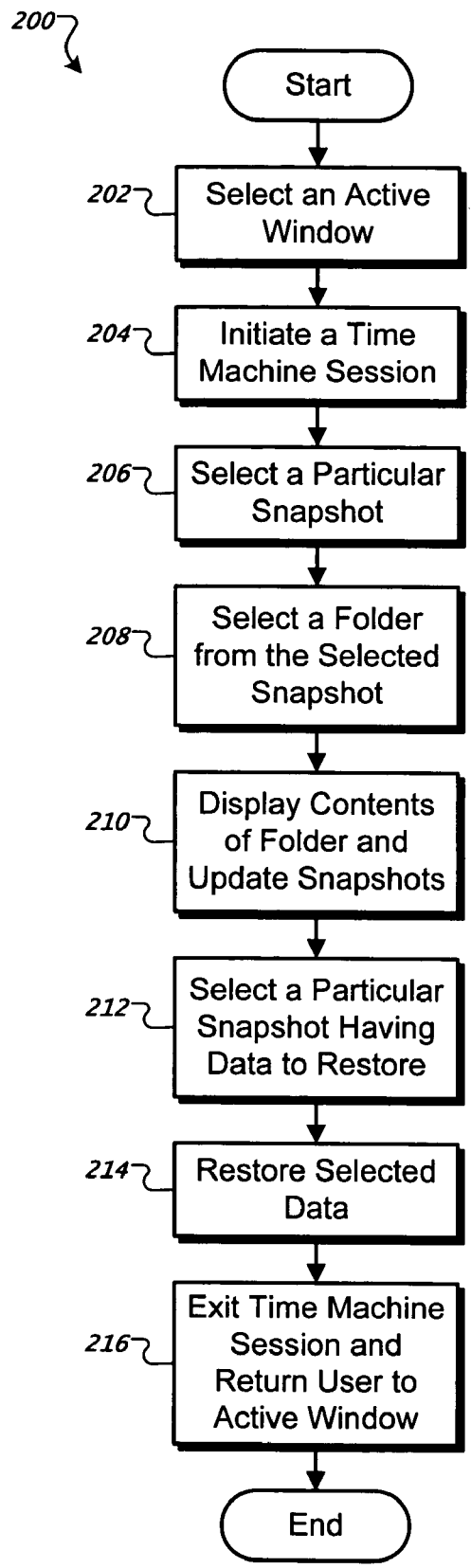
FIG. 2 is a flow diagram of a method illustrating an example of a hierarchy scenario.

FIG. 2 is a flow diagram of an example of a method 200 illustrating a hierarchy scenario. The method 200 can be performed in connection with presenting a user with a list of options in a "time machine" user interface that allows the user to selectively restore a currently displayed portion or item in a user interface, or part thereof, to an earlier state that is presented by the time machine user interface. Particularly, the method can allow the user to navigate, using one or more snapshots, through a hierarchy of folders stored in the time machine. For example, the user can restore all or part of any element that includes one or more folders, files, items, information portions, directories, images, system parameters, playlists, preferences, application states, and the like. The time machine user interface can contain several snapshots in time displaying a visual representation of elements, the underling data for the snapshots being stored, for example, in a backup archive. When one or more folders exist in a snapshot, the method allows the user to navigate through the hierarchy of folders to restore a selected portion or portions of the snapshot.

The method 200 begins when a user selects 202 an active window in a user interface, and initiates 204 a time machine session for the selected window. For example, the user can initiate the backup management engine 120 to initiate the time machine session.

Initiating 204 a time machine session can, in one implementation, create a timeline display automatically within the time machine session. Alternatively, the time machine timeline can be displayed when a prompt is received from the user (e.g., a mouseover). The timeline display includes graphic descriptions of previous versions of the active window. In one implementation, the timeline display includes a control to allow a user to modify the timeline or create a new timeline. For example, a user can select a setting to save one snapshot for a particular file at a specific time each day. In some implementations, multiple snapshots of each folder, file or item can be saved each day. By snapshot, we refer herein to a version of an item that is captured and stored for potential future restoration. In addition, the previous versions included in the timeline display may have been retrieved according to a schedule or according to a set of rules (e.g., events which trigger a snapshot). The criteria can be preexisting or can be user-defined or programmatically defined. For example, snapshots can be taken simply as a function of time (e.g., hourly, daily, etc). Alternatively, the snapshots can be taken when a triggering event occurs. For example, adding, deleting, or modifying an element can trigger the snapshot to be taken. However, some modifications may not be significant enough to trigger a snapshot. For example, changing the name of a file may not be a significant change and can be disregarded and not result in the creation of a snapshot or otherwise disregarded (e.g., a snapshot that includes such a trivially modified element can indicate that no change has arisen since the last snapshot, effectively disregarding the trivially modified element). In another example, for a music database application such as iTunes, there are file changes indicating play counts for particular songs that may be unimportant to the actual content in the file, and therefore disregarded when creating a snapshot. In one implementation, the backup capture engine 122 captures the snapshot(s) at one or more times specified by the backup rules engine 124.

When an active window has been selected 202, and a time machine session has been initiated 204, the user can select 206 a particular snapshot. The time machine user interface (e.g., the presentation window) updates according to the selected snapshot, such as by presenting the contents of the selected snapshot. When the snapshot contains one or more folders, the user can select 208 a folder in the presentation window to see its contents. The contents of the folder are presented 210 and the timeline is updated to show snapshots of only the selected folder. This is an example of the user navigating through the hierarchy of folders. In one implementation, the navigation is provided by the backup navigation engine 130.

The user can select 212 a particular snapshot having data to restore. In some implementations, the user can select a portion of the earlier version represented by the snapshot for restoration, as opposed to restoring the entire earlier version. The selected data is restored 214, the time machine session is exited, and the user is returned 216 to the active window. This provides, for example, that the user can employ the time machine to go back and restore one or more pieces of information that were part of the earlier version of for example a folder, but have since been removed or otherwise modified, wherein the restoration is performed on material organized in a hierarchy. There can be provided a preview of the snapshot, for example so that the user can review the contents and decide whether to make the restoration. In some implementations, the preview is provided by the backup preview engine 128.

In some implementations, steps or groups of steps can be repeated, such as selecting 206 a snapshot, selecting 208 a folder, and updating 210 the timeline and snapshot presentations. For example, a user can repeatedly select 208 folders to be presented while moving through a series of nested folders. In addition, some steps can be performed in an order other than the order depicted here. For example, the time machine can exit 216 before selecting 212 and restoring 214 a snapshot or a new top level snapshot can be selected 206 after selecting 208 a folder from a previous snapshot.

Accordingly, there can be performed a method or process that allows the user to restore a previously captured user interface state. Such a method can include evaluating a current view of a user interface including evaluating a state of an organization and content of a structured element presented in the current view, determining that an undesirable change to the current view of the user interface has occurred relative to a past view of the user interface, the undesirable change relative to the organization or content of the structured element, suspending the current view of the user interface, presenting one or more past views of the user interface each including an organization and content of the structured element at a respective time, and reinstating a past view of the user interface into the current view including reinstating an organization or content of the structured element.

As another example, there can be performed a method or process for capturing and using at least one previous user interface state. Such a method can include defining a criterion for capturing a state of a structured element, the structured element including one or more second elements and being presented in a user interface, capturing a state of the structured element including capturing an organization and content of the structured element, receiving a prompt to suspend presentation of a current view and present a captured view, the captured view including organization and content of the structured element at a previous time, and reinstating the captured view into the current view of the user interface.

Figure 3:
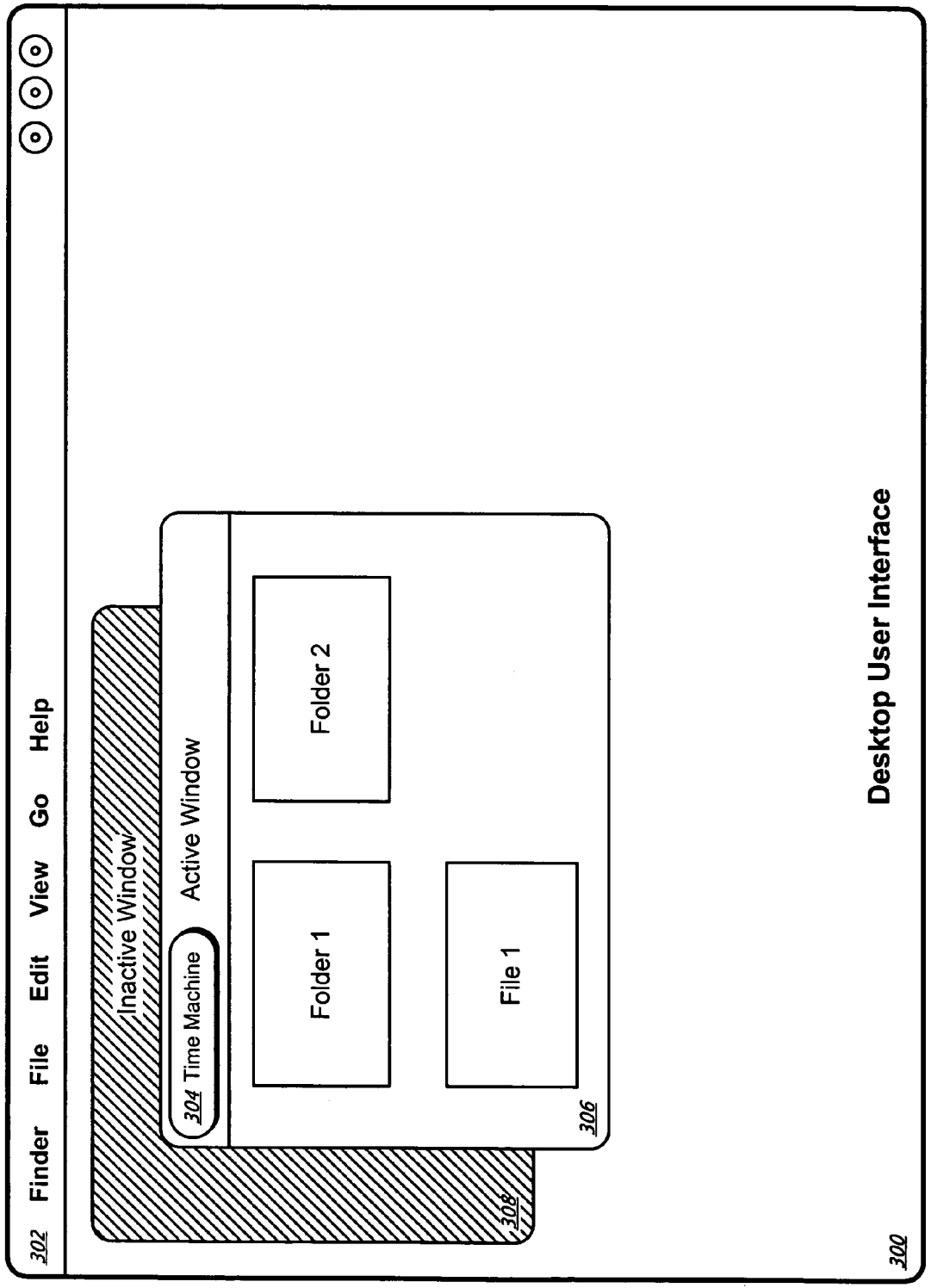
FIG. 3 is a screen shot depicting an example of a user interface prior to initiation of a time machine session.

FIG. 3 is a screen shot depicting an example of a user interface 300 (e.g., a desktop user interface) prior to initiation of a time machine session. The user interface 300 (also referred to herein as "desktop") is a user interface as can be provided by an operating system. The user interface 300 has a background, a menu bar 302 and can include windows, icons, and other elements. The user interface 300 can have multiple applications running, any or all of which can be presented in a separate window. In one implementation, the user activates a time machine session by selecting a Time Machine icon 304 located in an active window 306. For simplicity, one active window 306 and one inactive window 308 are shown. The active window 306 can contain various types of elements. For example, here the active window 306 contains Folder 1, Folder 2, and File 1. Generally, a window can contain any kind of item or element, such as information, playlists, or data of various types. In some implementations, the active window can be scaled upon entering the time machine to fit within the interface. For example, if an application is running in full screen mode (e.g., iTunes) when the time machine session is initiated, the application window can be scaled down to fit within the time machine interface. In one implementation, the user interface 300 and associated active window 306 is obscured or otherwise hidden while the time machine is active.

Figure 4A:
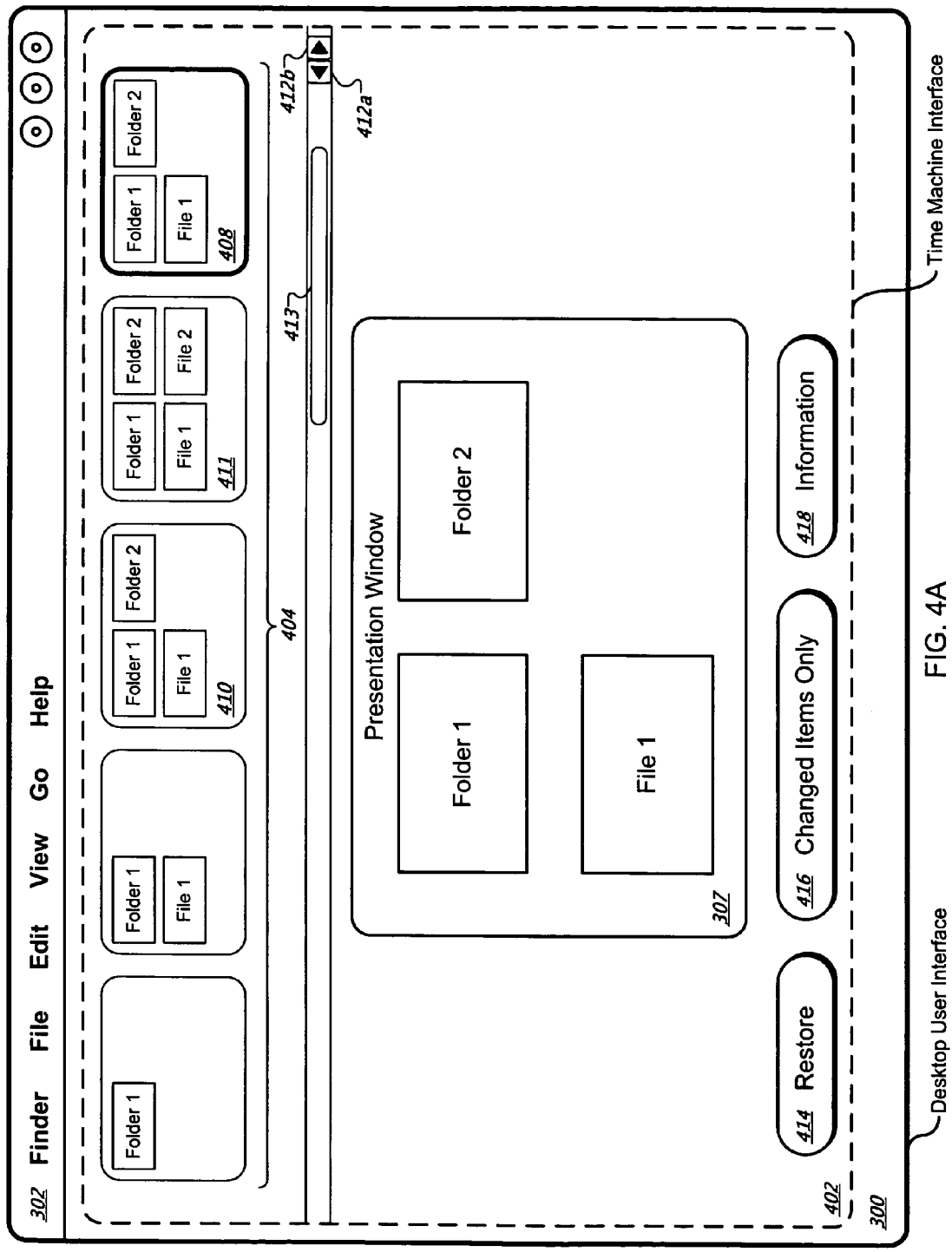
FIG. 4A is a screen shot depicting an example of an initial state for a time machine user interface.

FIG. 4A is a screen shot depicting an example of an initial state for a time machine user interface 402 after the Time Machine icon 304 has been selected. The time machine interface 402 includes a presentation window 307, a timeline 404, and function buttons. The timeline 404 presents a history view associated with the current view. The time machine interface 402 is shown in FIG. 4A as a layer differentiated from the desktop by a dashed line around the perimeter of the user interface.

The presentation window 307 can show the currently selected snapshot, or a portion thereof. The presentation window 307 represents the present level of the selected snapshot. Alternatively, the presentation window 307 can show a selected one of several available snapshots. In one example, a user can operate the time machine interface 402 so as to sequentially select each snapshot and can restore elements from these selected snapshots until the current version engulfs the entire history of the timeline 404, or some portion thereof. For example, the user can select a snapshot in the timeline 404 and merge its contents with the current active window contents by restoring each element individually, and keeping both versions in some cases, to achieve a merged list of elements.

The timeline 404 can include a number of snapshots representing slices of time for active window elements. Each snapshot provides a screenshot representation of an earlier version of the active window 306 at a particular point in time. The snapshots can represent periodic backup points in time or can represent snapshots of the active window where a change has occurred. FIG. 4A shows a scenario where the snapshots represent changes over time.

In some implementations, the timeline 404 includes a visual representation of elements, and can appear across the top portion of the time machine interface 402 (as shown). Alternatively, the timeline may not appear in the top portion of the time machine interface 402 until a user moves their cursor (or otherwise activates) to the top portion of the interface.

In some implementations, snapshots are shown according to when they are taken, regardless of changes between snapshots. In some implementations, a snapshot indicates a range of time covered by the snapshot where no other changes have occurred (e.g., Jun. 1-Aug. 8, 2005). In some implementations, the rate of snapshots varies over time. For example, there can be a number of snapshots in the newest archives, but the snapshots become more spaced in time as they reach further into the past. For example, hourly snapshots for the current day can turn into daily snapshots, which turn into weekly snapshots that become monthly snapshots as their file dates reach further into the past. The transition to later snapshots can be achieved in one implementation, by selecting a representative snapshot from a group of snapshots and deleting the rest.

Figure 4B:
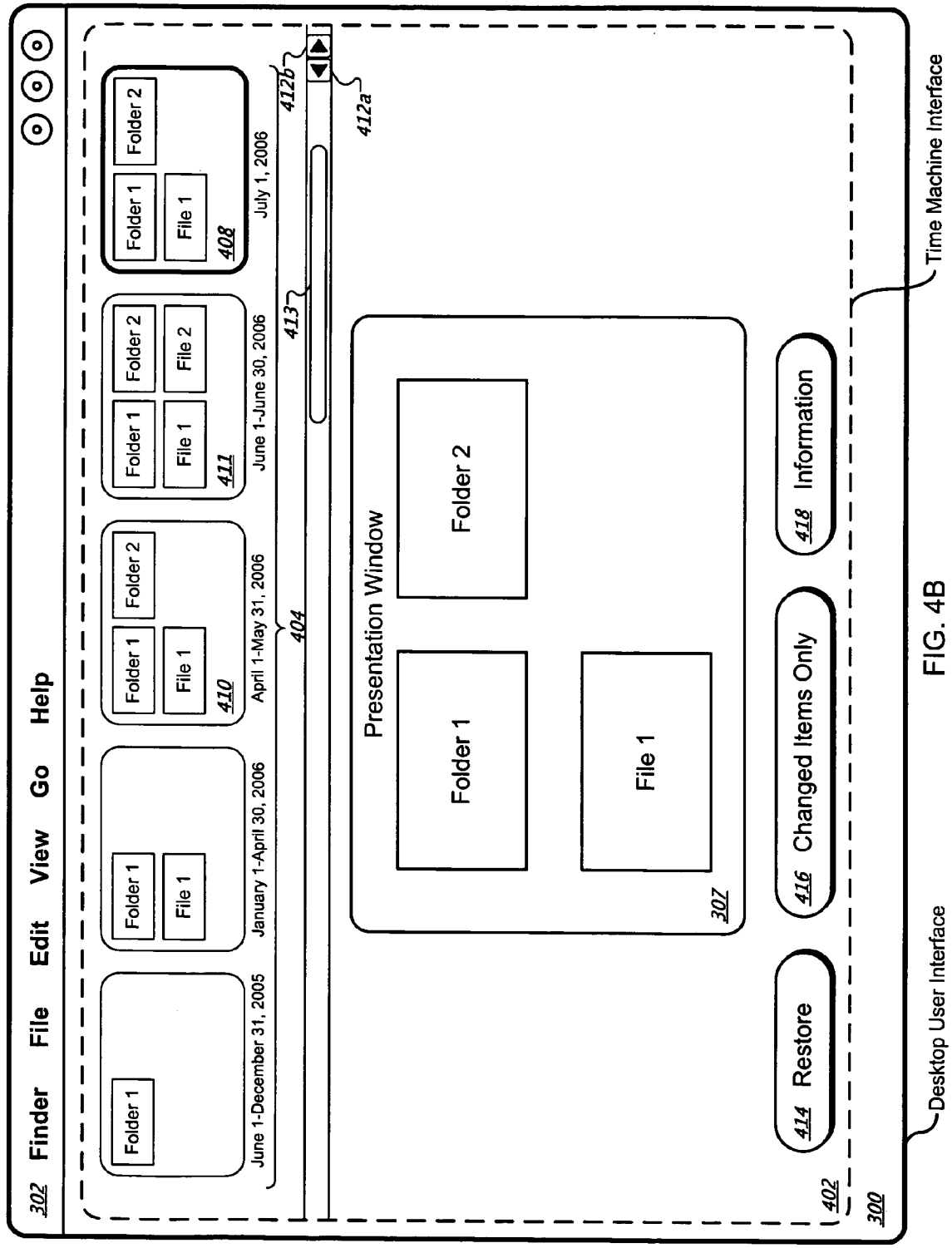
FIG. 4B is a screen shot depicting an example of an initial state for a time machine user interface including a time range reflected in each shown screenshot.

FIG. 4B shows an example screenshot where the snapshots are shown as having a varied time range, which increases with time. In FIG. 4B, the most recent displayed snapshot, snapshot 408 shows a snapshot for a single day. The next snapshot in the past (snapshot 411), however, shows a single snapshot having a date range of Jun. 1-Jun. 30, 2006. Thus, there were no changes during to the content between those dates. The next changed snapshot (snapshot 410) has a range from Apr. 1-May 31, 2006. Again, during that time period there were not changed snapshots. In one implementation, compressing snapshots of the same content to a wider date range has a similar effect to just presenting snapshots indicating a change from previous snapshots. However, in one implementation, if the time range or ranges are predefined, there could be adjacent snapshots presented with unchanged content if there were no changes over a time greater than the predefined range.

As shown in FIG. 4A, the most recent snapshot 408 is shown with a highlighted border. This represents the present state of the active window content. The other snapshots shown in the timeline 404 represent states of the active window 306 in the past from which there have been changes to the content of the active window 306. For example, snapshot 410 represents a point in time where the active window 306 included Folder 1, Folder 2, and File 1, while snapshot 411 represents a point in time where the active window 306 included Folder 1, Folder 2, File 1, and File 2. Between the snapshot 410 and the snapshot 411, File 2 was added.

The other snapshots in the timeline 404 show other configurations of past states of the active window 306. For example, different numbers of elements show additions and deletions that have occurred over time. The time machine interface 402 can also show modifications that have been made between different versions of folders, files, or items, and the like.

Arrow buttons 412a and 412b and an associated scroll bar 413 allow the user to navigate to additional snapshots not shown, thus there can be a large number of snapshots from which to select.

The time machine interface 402 includes a restore button 414, a changed items only button 416, and an information button 418. Other buttons are possible. The restore button 414, when selected, restores the window to the selected state represented by the selected snapshot and exits the time machine. A user can select a snapshot and then select the restore button 414 to modify the current version of the element selected. The changed items only button 416 filters the snapshots to show only those that differ from the current state. That is, the changed items only button 416 does not refer to the incremental changes between snapshots in the timeline 404, rather, it refers to omitting those snapshots whose states are identical to the current state of the active window 306. For example, if the most recent snapshot 408 is identical to the snapshot 410 that occurs earlier in time, selecting the changed items only button 416 will cause the time machine to cease displaying one of the copies, e.g., remove the snapshot 410 from the timeline. This can help the user locate a previous version from which to restore contents different from those in the current version.

The information button 418 provides information regarding the selected snapshot. In one implementation, selecting the information button 418 opens a panel display. The panel display provides in one implementation, information including the date and time the snapshot was made, the location of actual elements of a snapshot, the size of the snapshot, and a comment section.

Figure 5:
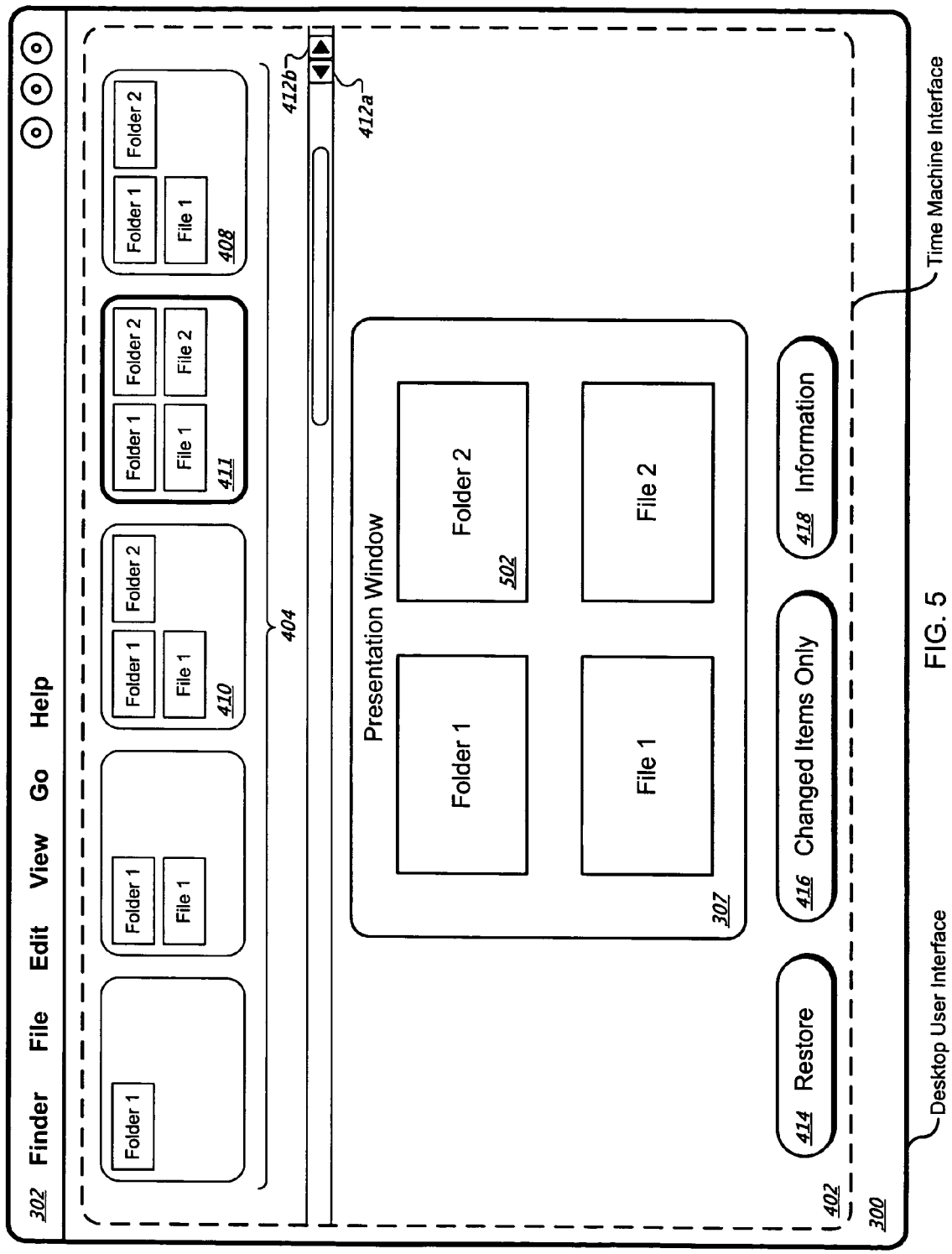
FIG. 5 is a screen shot depicting an example of a time machine user interface where a user has selected a particular snapshot and folder in a first hierarchical level.

FIG. 5 is a screen shot depicting an example of the time machine user interface 402 after the snapshot 411 has been selected for presentation. The presentation window 307 changes to reflect the newly selected snapshot 411. For example, if a folder 502 has been corrupted in the current version, the user could select the restore button 414 and retrieve an earlier version of the folder 502 from the snapshot 411. In contrast, restoring the entire active window 306 would restore everything in the current version with the earlier version of each element, thereby overwriting potentially useful information.

Figure 6:
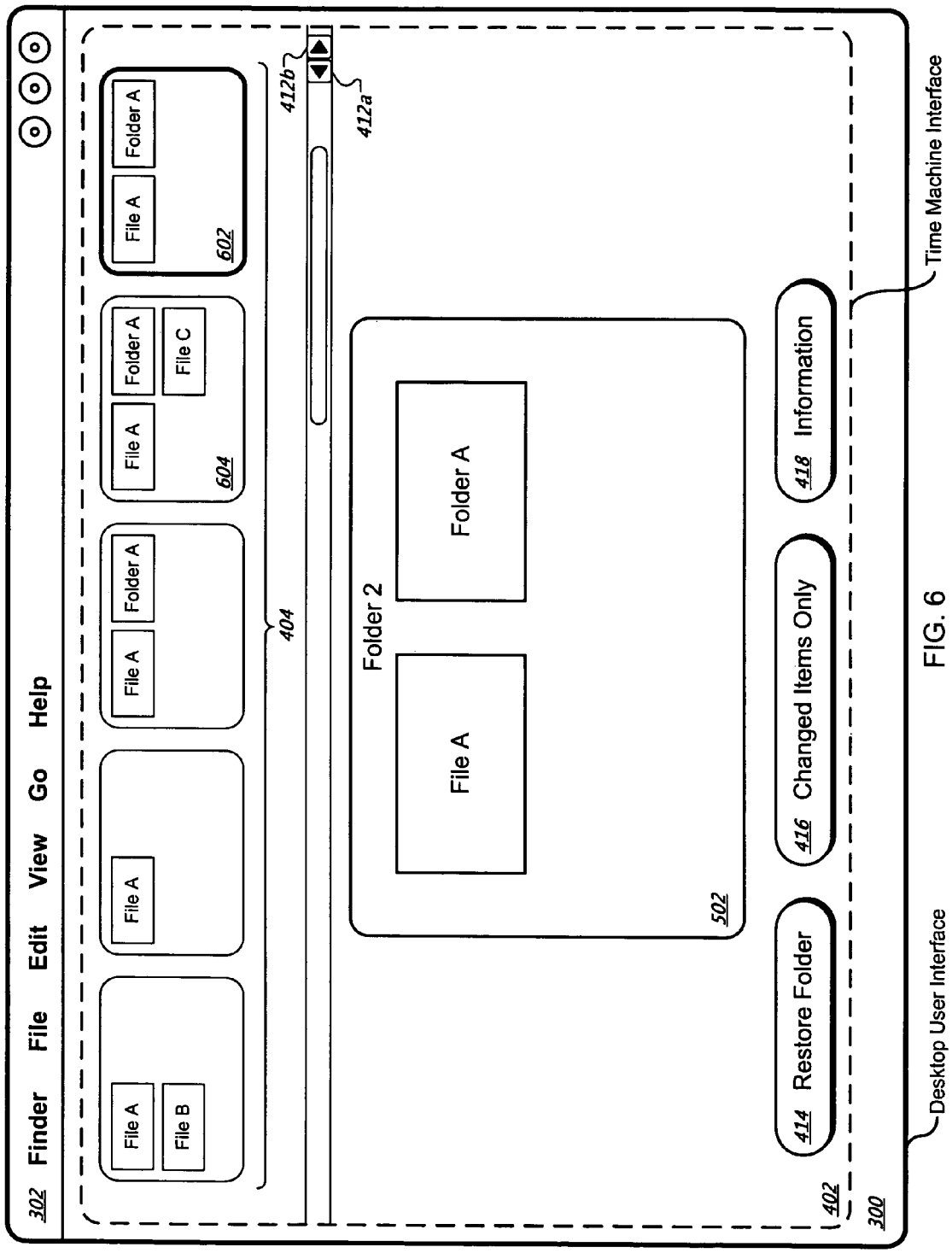
FIG. 6 is a screen shot depicting an example of a time machine user interface after navigating to a second hierarchical level.

FIG. 6 is a screen shot depicting an example of the time machine user interface 402 after the folder 502 has been selected for presentation. For example, a user can select the folder 502 for presentation by double-clicking on the folder's icon in the presentation window 307. The present level now shown in the presentation window 307 is the hierarchical structure of the folder 502. In addition, the timeline 404 now shows historical snapshots of the folder 502 instead of the active window 306, such as snapshots 602 and 604. In some implementations, the snapshots 602 and 604 can be sub-levels of the snapshots 408 and 411, respectively. In some implementations, the logic previously described for choosing snapshots to record and display can also be applied to sub-level snapshots, such as the snapshots 602 and 604. For example, the snapshots 602 and 604 can represent two points in time between which a change was made in the folder 502 and the snapshots 602 and 604 need not correspond to the higher level snapshots 408 and 411.

In the previous example, the user navigated to an earlier snapshot within the time machine. The user then navigated down to the hierarchical structure within the snapshot where the files and folders for restoration resided. In another example, the user can navigate to the hierarchical structure before initiating the time machine. Then upon initiating the time machine, the present level shown is immediately that of the folder 502. In addition, snapshots of the folder 502 are presented in the timeline 404.

In this way, the time machine user interface 402 allows the user to analyze changed content before a restore is performed by allowing the user to navigate through a hierarchy of folders in a snapshot to the hierarchical structure or structures to be restored. In addition, the restore button 414 can change to indicate that only a portion of a parent snapshot, such as the snapshot 411, will be restored by selecting the button 414. For example, the text label on the button 414 can change from "Restore" to "Restore Folder." The restore folder button 414 restores the selected folder-502 and leaves the rest of the snapshot 411 intact.

Figure 7:
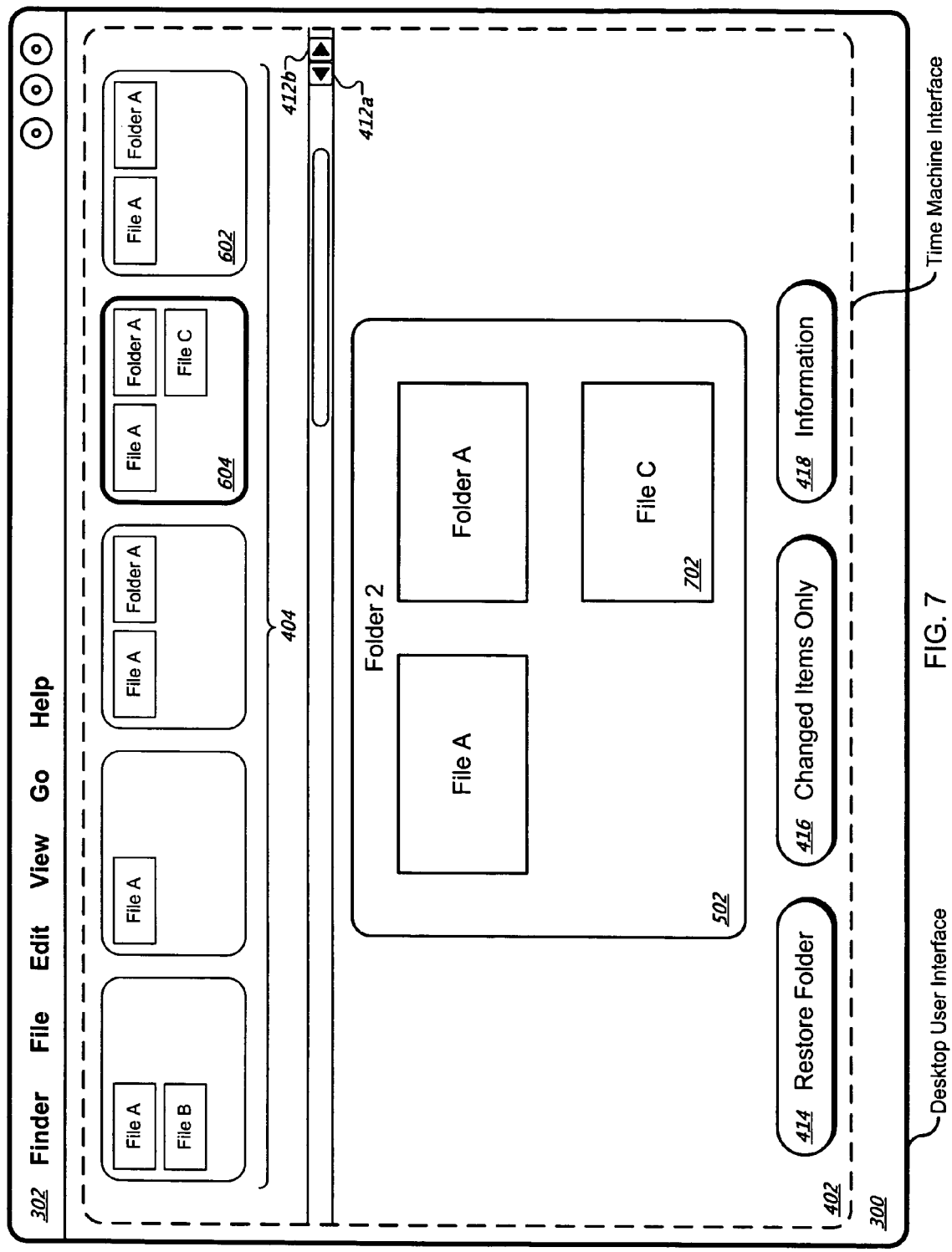
FIG. 7 is a screen shot depicting an example of a time machine user interface where a user has selected a particular snapshot in the second hierarchical level.

FIG. 7 is a screen shot depicting an example of the time machine user interface 402 after the user selects the snapshot 604 of the folder 502. The presentation window showing the folder 502 now includes a file 702 from the snapshot 604 among other items. The file 702 represents a change between the snapshot 604 and the snapshot 602. Between the snapshot 604 and the snapshot 602, the file 702 was deleted. While this example shows that a file was deleted, the time machine user interface 402 can also indicate other modifications to elements than additions and deletions.

Figure 8:
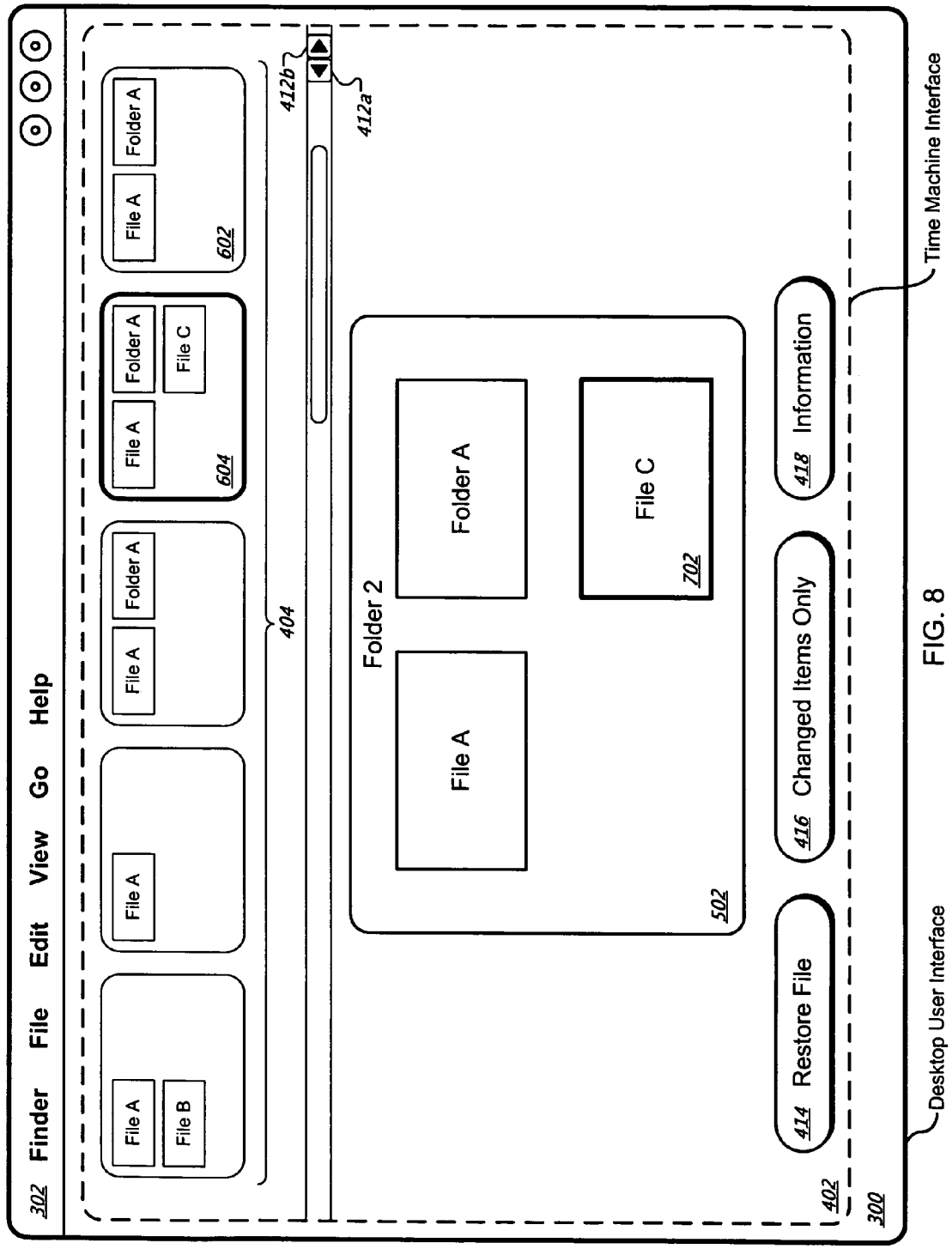
FIG. 8 is a screen shot depicting an example of a time machine user interface where a user has selected a particular folder in the second hierarchical level.

FIG. 8 is a screen shot depicting an example of the time machine user interface 402 after selecting the file 702. Here, the restore button 414 will only restore the selected file 702, as indicated by the text "Restore File." The time machine user interface 402 has allowed the user to navigate from a top-level hierarchical structure at the active window 306, through a mid-level hierarchical structure at the folder 502, and finally to a bottom level hierarchical structure at the file 702. In general, the time machine user interface 402 is not restricted to the number of hierarchical levels shown here and more or fewer hierarchical levels can exist in a particular snapshot. After the user selects the restore button 414 to restore the file 702 the time machine user interface 402 exits and returns the user to the user interface 300. In some implementations, the time machine returns the user to the user interface 300 as it appeared in FIG. 3 prior to initiating the time machine user interface 402.

Figure 9:
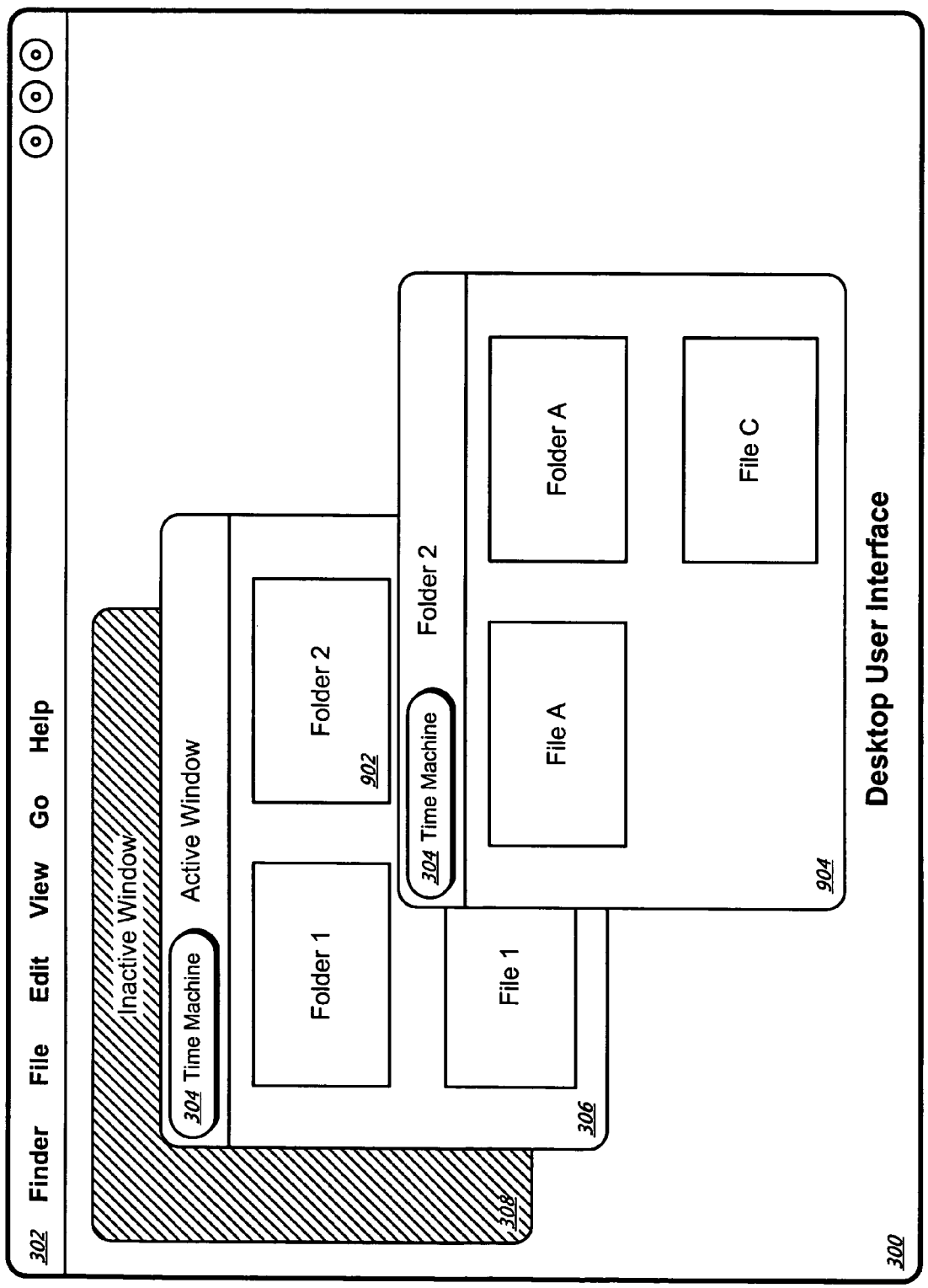
FIG. 9 is a screen shot depicting an example of a user interface after restoring a portion of a snapshot.

FIG. 9 is a screen shot depicting an example of the user interface 300 including the folder 502. For example, a user can have selected a folder icon 902 shown in the active window 306 to open the folder 502 and present its contents in a window 904. As shown here, the user interface 300 now includes the file 702 as restored from a historical snapshot. In some implementations, upon restoring the file 702, the time machine user interface 402 can return the user to the user interface 300 at the hierarchical level navigated to within the time machine user interface 402. In some implementations, the time machine user interface 402 can return the user to a state of the user interface 300 including the previous active window 306 and the newly navigated to folder 502.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method relating to modifying a view in a user interface, the method comprising:
   receiving, while a current view of an active window is displayed in a user interface, a first user input requesting that a history view of the current view of the active window be displayed;
   displaying the history view in a presentation window distinct from the active window in response to the first user input, the history view including at least a first representation of the active window as the active window existed at a time in the past, where the first representation shows a past state of the current view of the active window and includes visual representations of elements from the past state, where the underlying data for the representation is stored in a backup archive, and where the first representation includes a first element and a second element of the past state, the first and second elements having a hierarchical structure wherein the first element includes the second element;
   receiving, while the first representation is displayed, a second user input requesting that the current view of the active window be modified according to the second element; and
   modifying the current view of the active window, in response to the second user input, to reflect the second element.

2. The method of claim 1, wherein the first element is one selected from a group consisting of: a folder, a file, an item, an information portion, a playlist, a directory, an image, system parameters, and combinations thereof.

3. The method of claim 1, wherein the second user input is received while the current view presents a level of the hierarchical structure associated with the first element.

4. The method of claim 1, wherein the first user input is received while the current view presents a level of the hierarchical structure associated with the second element.

5. The method of claim 1, wherein the first representation is included in a timeline presented in the history view, the timeline including several representations of past states of the current view.

6. The method of claim 5, wherein the presentation window further includes an input control for modifying the timeline to include only at least one of the representations whose corresponding past state differs from the current view.

7. The method of claim 5, wherein the user selects the second element, further comprising displaying a revised timeline in response to the selection, the revised timeline including a second visual representation of a past state of the second element.

8. The method of claim 1, wherein the first element has a folder structure.

9. The method of claim 8, wherein the second element is a file in the folder structure of the first element.

10. The method of claim 1, wherein receiving the second user input comprises:
    receiving an input to traverse the hierarchical structure and display the second element.

11. The method of claim 1, further comprising:
    displaying, in response to the second user input, the modified current view.

12. A machine-readable storage device or a machine-readable storage substrate having stored thereon instructions which, when executed by a processor, cause the processor to perform operations comprising:
    receiving, while a current view of an active window is displayed in a user interface, a first user input requesting that a history view of the current view of the active window be displayed;
    displaying the history view in a presentation window distinct from the active window in response to the first user input, the history view including at least a first representation of the active window as the active window existed at a time in the past, where the first representation shows a past state of the current view of the active window and includes visual representations of elements from the past state, where the underlying data for the representation is stored in a backup archive, and where the first representation includes a first element and a second element of the past state, the first and second elements having a hierarchical structure wherein the first element of the past state includes the second element;
    receiving, while the first representation is displayed, a second user input requesting that the current view of the active window be modified according to the second element; and
    modifying the current view of the active window, in response to the second user input, to reflect the second element.

13. The machine-readable storage device or machine-readable storage substrate of claim 12, having instructions further stored thereon which cause the processor to perform operations comprising:
    displaying, in response to the second user input, the modified current view.

14. A computer program product tangibly embodied in a machine-readable storage device or a machine-readable storage substrate, the computer program product including instructions that, when executed, generate on a display device a graphical user interface comprising:
    a view display area for presenting a current view of an active window;
    a history view display area for presenting a presentation window distinct from the active window, the presentation window including a history view of the current view of the active window, the history view including at least a first representation of the active window as the active window existed at a time in the past, where the first representation shows a past state of the current view of the active window and includes visual representations of elements from the past state, where the underlying data for the representation is stored in a backup archive, and where the first representation includes a first element and a second element of the past state, the first and second elements having a hierarchical structure wherein the first element includes the second element; and a revised version of the history view after a user selects the second element, the revised version including at least a second representation including a visual representation of an earlier version of the second element; and an input control for initiating a modification of the current view of the active window to reflect the second element.

15. The computer program product of claim 14, wherein the graphical user interface begins displaying the history view while the current view presents a level of the hierarchical structure associated with the first element.

16. The computer program product of claim 14, wherein the graphical user interface begins displaying the history view while the current view presents a level of the hierarchical structure associated with the second element.

17. The computer program product of claim 14, wherein the first representation is included in a timeline presented in the history view, the timeline including several representations of past states of the current view.

18. The computer program product of claim 17, wherein the presentation window further includes another input control for modifying the timeline to include only at least one of the representations whose corresponding past state differs from the current view.

19. The computer program product of claim 17, wherein the revised history view includes a revised timeline that includes the second representation of the earlier version of the second element.

20. The computer program product of claim 14, further including instructions that, when executed, generate on a display device a graphical user interface further comprising:
a view area for displaying the modified current view.

21. A method comprising:
defining a criterion for determining when to capture a state of a structured element, the structured element including one or more second elements and being presented in a user interface;
capturing a state of the structured element including capturing an organization and content of the structured element, and storing the captured state in a backup archive;
receiving a prompt to suspend presentation of a current view of an active window associated with the structured element and to present a captured view of the active window in a presentation window distinct from the active window, the captured view including a first representation of the active window as the active window existed at a previous time, where the first representation shows a previous state of the current view of the active window including a previous organization and content of the structured element, the previous organization and content of the structured element corresponding to the captured state of the structured element; and
modifying the current view of the active window to reflect the previous organization and content of the structured element.

22. The method of claim 21, further comprising:
while presenting the captured view, navigating the structured element to locate the one or more second elements.

23. The method of claim 21, further comprising:
while presenting the captured view, traversing the structured element to display one or more sub-structure elements.

24. The method of claim 21, wherein the criterion includes capturing a state of the structured element when any element is moved to the active window or moved from the active window.

25. A machine-readable storage device or a machine-readable storage substrate having stored thereon instructions which, when executed by a processor, cause the processor to perform operations comprising:
defining a criterion for determining when to capture a state of a structured element, the structured element including one or more second elements and being presented in a user interface;
capturing a state of the structured element including capturing an organization and content of the structured element and storing the captured state in a backup archive;
receiving a prompt to suspend presentation of a current view of an active window associated with the structured element and to present a captured view of the active window in a presentation window distinct from the active window, the captured view including a first representation of the active window as the active window existed at a previous time, where the first representation shows a previous state of the current view of the active window including a previous organization and content of the structured element, the previous organization and content of the structured element corresponding to the captured state of the structured element; and
modifying the current view of the active window to reflect the previous organization and content of the structured element.

26. The machine-readable storage device or machine-readable storage substrate of claim 25, wherein the criterion includes capturing a state of the structured element when any element is moved to the active window or moved from the active window.

27. A method comprising:
evaluating a current view of a user interface including evaluating a state of an organization and content of a structured element presented in the current view;
determining that an undesirable change to the current view of the user interface has occurred relative to a past view of the user interface, the undesirable change relative to the organization or content of the structured element;
suspending the current view of the user interface;
presenting one or more representations of past views of the user interface in a presentation window distinct from the user interface, each representation corresponding to a view of the user interface as the user interface existed at a respective time in the past and including an organization and content of the structured element at the respective time, where the underlying data for each representation is stored in a backup archive; and
reinstating a past view of the user interface into the current view including reinstating an organization or content of the structured element.

28. The method of claim 27, further comprising:
navigating a presented representation of a past view to locate one or more structured elements.

29. The method of claim 27, further comprising:
traversing a structured element to display one or more sub-structure elements associated with the structured element.

30. A machine-readable storage device or a machine-readable storage substrate having stored thereon instructions which, when executed by a processor, cause the processor to perform operations comprising:
evaluating a current view of a user interface including evaluating a state of an organization and content of a structured element presented in the current view;
determining that an undesirable change to the current view of the user interface has occurred relative to a past view of the user interface, the undesirable change relative to the organization or content of the structured element;
suspending the current view of the user interface;
presenting one or more representations of past views of the user interface in a presentation window distinct from the user interface, each representation corresponding to a view of the user interface as the user interface existed at a respective time in the past and including an organization and content of the structured element at the respective time in the past, where the underlying data for each representation is stored in a backup archive; and
reinstating a past view of the user interface into the current view including reinstating an organization or content of the structured element.

* * * * *

UNITED STATES PATENT AND TRADEMARK OFFICE
CERTIFICATE OF CORRECTION

| | | |
|---|---|---|
| PATENT NO. | : 7,853,566 B2 | |
| APPLICATION NO. | : 11/499879 | |
| DATED | : December 14, 2010 | |
| INVENTOR(S) | : Pavel Cisler et al. | |

It is certified that error appears in the above-identified patent and that said Letters Patent is hereby corrected as shown below:

On the Title Page, in field (75), in column 1, in "Inventors", line 9, delete "M W A" and insert -- MWA --, therefor.

On Title Page 3, in column 1, item (56); under "Other Publications", line 20, delete "Wellesly" and insert -- Wellesley --, therefor.

In column 1, line 35, delete "Back Up" and insert -- Backup --, therefor.

Signed and Sealed this
First Day of November, 2011

David J. Kappos
*Director of the United States Patent and Trademark Office*